May 15, 1973  J. H. CRAWFORD  3,733,243

NET

Filed Nov. 24, 1971

United States Patent Office 3,733,243
Patented May 15, 1973

3,733,243
NET
James H. Crawford, Anniston, Ala., assignor to Indian Head, Inc., New York, N.Y.
Filed Nov. 24, 1971, Ser. No. 201,713
Int. Cl. B32b 3/06
U.S. Cl. 161—48                                                    14 Claims

ABSTRACT OF THE DISCLOSURE

A net comprising mutually crossing lines interconnected at the intersections to form meshes by two-piece thermoplastic connectors, the parts of which are ultrasonically fused together in situ. The two parts of each connector have grooves and recesses that match to define holes that receive and capture segments of the lines adjacent the intersections and a cavity that receives and captures the segments of the lines at the crossing points.

BACKGROUND OF THE INVENTION

This invention relates to a net and, more particularly, to an open-mesh net formed by mutually crossing lines interconnected at the intersections by mechanical connectors.

There are several techniques for interconnecting mutually crossing lines to form an open-mesh net, such as a rope net. Probably the most common technique at least, with relatively lightweight lines or ropes, is to knot the lines together at the intersections. However, for relatively heavy lines or ropes, the knots may become objectionably large and the lines be of such stiffness as to resist effective knotting so that it is necessary to resort to some other form of interconnection between the lines or ropes. One form of interconnection is afforded by whipping relatively light line or string around the lines of the net at each intersection. Another approach is to employ mechanical connectors.

SUMMARY OF THE INVENTION

The present invention involves an improvement in a net in which mutually crossing lines are interconnected at their intersections to form meshes by mechanical connectors. More particularly, there is provided, in accordance with the invention, a net comprising a multiplicity of flexible lines arranged in two groups, each group being composed of a multiplicity of lines disposed substantially parallel to each other in spaced-apart relation and the lines of one group crossing the lines of the other group at a multiplicity of spaced-apart line intersections to define meshes. The lines are interconnected at each intersection or crossing point by a connector that secures the lines against relative displacement. Each connector is composed of two parts, one of the parts being disposed on each side of a plane defined generally by the axes of the lines. Each connector part has grooves formed in its surface that faces the other connector so that when the two connectors are placed together, the grooves match to define holes in the connector that receive and capture segments of the lines adjacent the line intersection. The segments of the lines at the intersection, where there are two thicknesses of rope to accommodate, are received and captured by matching recesses in the two connector parts that define an enlarged cavity in the connector. The two connector parts have surfaces adjacent the grooves that match and engage each other and are adhered to each other to join the connector parts and render the connector essentially unitary.

Preferably, the connector parts are formed, such as by molding, from a rigid or semi-rigid polymeric material. If the polymeric material is thermoplastic, the preferred form of bond is a fusion bond provided by ultrasonic welding. Appropriate adhesives can also be used to join the two parts, regardless of the materials from which the connectors are made. From the point of view of facility of manufacture, however, an ultrasonic fusion bond has the advantage of being formed very rapidly and not requiring a long setting or curing time, such as is normally required by most adhesives. It follows, therefore, that a connector having parts made of a thermoplastic polymeric material and fusion-bonded together by ultrasonic welding is preferred.

The lines of the net may be of various flexible materials suited for the particular purpose for the net, for example, the lines may be made of metal or of natural of synthetic fibers or filaments. If the material of the net is a thermoplastic polymeric material, then a superficial fusion bond between the connector parts and the lines of the net at the intersections can be provided. However, it is preferable to restrict, or in some cases even prevent, the formation of a fusion bond between the connector parts and a thermoplastic polymeric material line since excessive fusion of the line material itself can seriously weaken the line. The degree of any fusion between the rope material and the connector material can be controlled in various ways, as will be discussed in greater detail below.

When the construction of the lines of the net permits, as it does with fibrous, or multifilament, and multistranded ropes, it is desirable to supplement the interlock between the lines at the intersections provided by clamping engagement of the connector parts with the lines and the capturing of the lines at the cross-over point by the enlarged cavity of the connector by providing projections or serrations in the grooves and recesses of the connector parts that protrude a short distance into the lines between the fibers, filaments or strands of the rope. Such projections or serrations may be sharp-pointed ridges or generally conical pins protruding inwardly from the surfaces of the grooves and recesses. It is also advantageous, as a matter of facilitating assembly of the net, to provide companion bosses and boss-receiving recesses in the two connector parts for facilitating registration of the two parts with each other and ensuring matching of the grooves, recesses and engaging surfaces. Moreover, it is also desirable to make the connector parts identical to each other so that only a single part is required for all connectors and so that any part will match any other part to form a connector pair. In the same vein, it is helpful to allow for multiple relative orientations of the connector parts in assembly; for example, when the lines of the net are mutually perpendicular, each connector part can have four quadrants which are dimensionally and geometrically identical, so that the two parts may be placed together in any of the four relative orientations in which the mutually perpendicular axes subdividing the parts into the four quadrants are aligned with each other.

In a form of connector embodying parts of thermoplastic materials that are bonded together by ultrasonically-formed fusion bonds, the mating and engaging surfaces of the connectors are preferably formed with projections that provide for concentration of energy absorption and promote rapid and effective fusion at the interface between the mating and engaging surfaces to provide a strong bond between the connector parts.

A net according to the invention, provides numerous advantages, particularly the preferred form in which thermoplastic connector parts are ultrasonically fused to form an essentialy unitary connector at each line intersection. With this form, the parts may be pre-manufactured and the net quickly and easily assembled by placing the two parts together with the ropes between them and then using an ultrasonic welding device rapidly to make the fusion bond between the parts. The formation of the bond takes only a few seconds to complete. The use of identical parts means that there is only one piece to manufacture, and the manufacture of thermoplastic connector parts can be accomplished very inexpensively by injection molding. The dimensioning and geometry of the parts can be varied to suit the particular conditions. If very strong connections at the line intersections are required, the size of the connector parts can be increased to provide a greater fusion area to prevent the parts made very smooth so that abrasion of a surface with which the net may be engaged in use is virtually eliminated. The invention also permits the manufacture on a volume basis of relatively low cost nets that are suitable for a variety of purposes. A particularly interesting use for nets constructed according to the invention is in a barrier structure for containing accidental oil spills. Several installations of the nets used as a structural support for plastic film around offshore-oil-well platforms have been made and have provided excellent service thus far. A plastic film is secured to the top and bottom of a long net that is strung entirely around the platform and provides an impermeable barrier or fence for containing any oil spillage. Any oil spill captured by the net can readily be vacuumed from the fenced area. The smooth surfaces of the connectors virtually eliminate abrasion of the plastic film and thus provide a long useful life. The use of plastic materials for the connectors eliminates the problems of corrosion and other forms of deterioration that could, with other materials, result from the action of sea water and sea life.

DESCRIPTION OF THE DRAWINGS

For a better understanding of the invention, reference may be made to the following description of an exemplary embodiment, taken in conjunction with the figures of the accompanying drawings, in which.

DESCRIPTION OF EXEMPLARY EMBODIMENT

Figure 1:
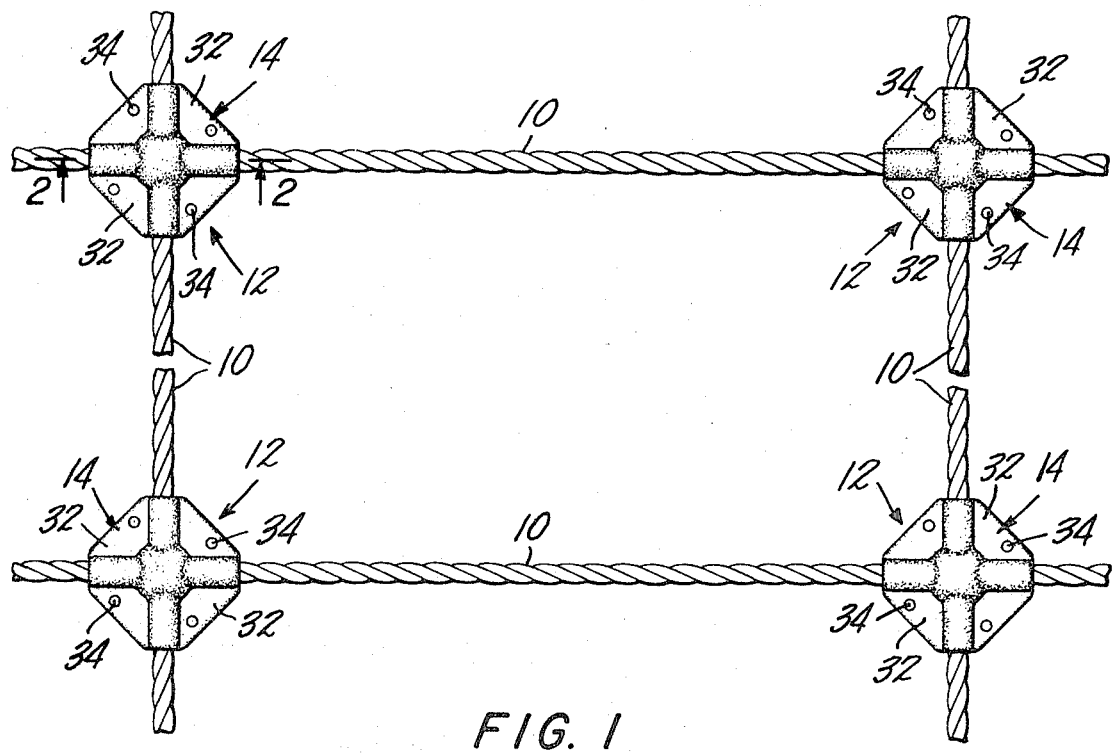
FIG. 1 is a plan view of a representative segment of a net, the portions of the lines of the net shown vertically on the drawing being broken away to reduce the size of the figure.

FIG. 1 of the drawings illustrates two adjacent spaced-apart lines 10 of each of two mutually crossing groups of lines that form the meshes of a net. As already mentioned, the lines may be of various materials and various constructions. For purposes of illustration, the lines 10 are twisted three strand ropes, each strand of which is made up of bundles of fibers or filaments of natural or synthetic material.

Figure 2:
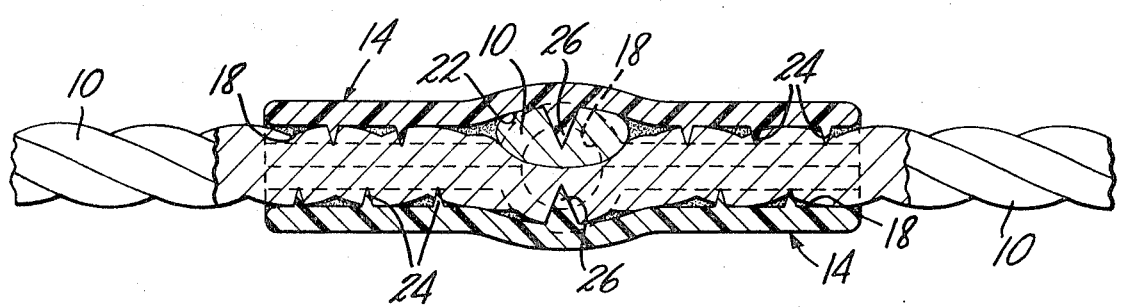
FIG. 2 is a side view in cross-section taken generally along the lines 2—2 of FIG. 1 and in the direction of the arrows, the view being on an enlarged scale, relative to FIG. 1.
Figure 3:
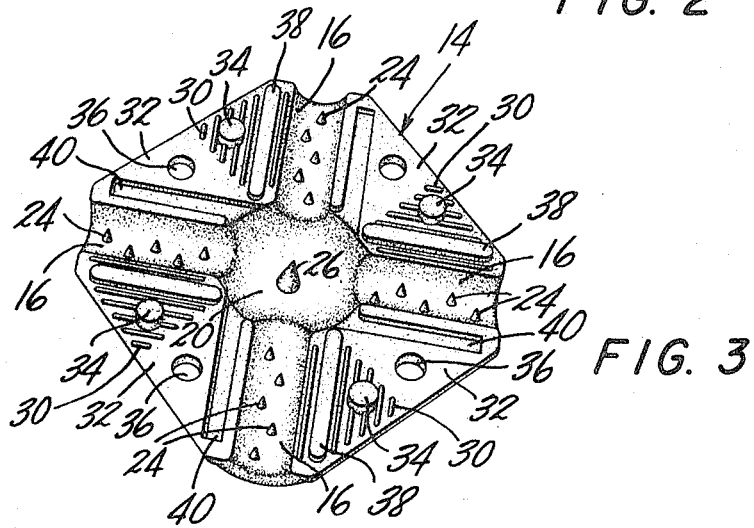
FIG. 3 is a pictorial view of one part of a connector, the view being of the inside of the connector part.

The lines are interconnected at each intersection or crossing point by a connector 12. Each connector is composed of two parts, one such part being located on either side of a plane defined by the axes of the lines 10 (it being understood that such a plane is with reference to the net when it is in flattened condition). The two parts of each connector 12 are identical to each other in all respects, and accordingly, both prats are assigned the reference numeral 14. Each connector part 14 is generally square in plan, and (see FIG. 3) has grooves 16 formed on its inner surface and extending generally diagonally. The grooves of each pair of parts making up a connector match and define holes 18 that are substantially circular in cross-section (see the dotted illustration in the center of FIG. 2) and receive and capture segments of each of the lines adjacent each intersection. At the center of each connector part 14 is a recess 20 that, of course, matches the corresponding recess of the other connector part to define an enlarged center cavity 22 (see FIG. 2) that receives the segments of the line at the intersection or crossing point. As illustrated in FIG. 2, the size of the cavity may provide a significant amount of compression on the lines at the crossing point to, in turn, provide a clamping action tending to restrain or hold the lines against relative displacement. A similar clamping action may be afforded by appropriate dimensioning of the recesses 16, relative to the diameter of the lines. The degree of compression and mechanical clamping between the two parts of the connector and the lines 10 can, of course, be varied to meet the requirements for holding the lines against relative displacement, but within the limitations of the materials to sustain clamping pressure.

In addition to the clamping engagement of the lines by the parts of the connector, a further mechanical engagement between the connector parts and the lines may be afforded by providing small projections, such as the sharp-pointed, conical-shaped projections 24 located at the bases of each of the grooves 16 of the connector part 14 and a similarly shaped, but somewhat larger, projection 26 located in the center recess 20. These and other geometric forms of small projections on the surfaces of the connector parts that engage the line assist in locking the lines against displacement or movement in the connector. In the case of the sharp pointed projections of the embodiment, they protrude into the fiber or filament structure of the line 10, as illustrated in FIG. 2.

The illustrated embodiment of the connector is formed of a thermoplastic material, and the two parts of the connector are bonded together by fusion bonds created by the energy generated by relative vibration between the parts at an ultrasonic frequency, a technique well known in plastic technology and generally referred to as ultrasonic welding. The fusion bonds are generated more rapidly and more effectively by providing small projections 30 on those surfaces of the connector parts that engage each other when the two parts are placed together. In particular, the connector illustrated in the drawings has web portions 32 constituted by the material in between the adjacent grooves 16. In general all opposite surfaces of the connector parts other than surfaces defining the holes and cavity for the lines are in engagement and are fusion-bonded to each other. The projections 30 are appropriately spaced and dimensioned to provide areas of energy concentration upon ultrasonic vibration so that the projections and the portions of the surfaces engaging the projections melt rapidly and flow to provide, upon cooling after the ultrasonic welding operation, a fusion bond that unites the two parts of the connectors and renders them substantially unitary.

As mentioned above, it is usually undesirable to provide any more than a superficial fusion bond between lines of thermoplastic material and the connectors, inasmuch as excessive fusion of the lines may weaken them significantly. Fusion between the connectors and the lines can be prevented altogether by using lines of non-thermoplastic material or by using a thermoplastic material that has a melting point substantially higher than that of the connector parts. Also, fusion can be restricted by using a lubricant coating on the segments of the lines that are engaged by the connectors. A lubricant will restrict the degree of energy adsorption at the interfaces between the lines and the connector parts.

Especially good results may be obtained by using a combination of ultrasonic welding and an adhesion to join the connectors and lines into a unit. A thermosetting adhesive can be partially or fully set during the ultrasonic welding operation. The use of an epoxy adhesive will provide the combined results of adhesion between the connector parts and the lines and inhibition of fusion by acting, in its liquid state, as a lubricant. It will be evident to those skilled in the art that various adhesives can be used in combination with ultrasonic welding to provide a strong connection between the lines and the connector parts.

Proper matching or registration of the connector parts during assembly of the net is facilitated by companion bosses 34 and boss-receiving holes 36 and by companion ribs 38 and rib-receiving slots 40 in the respective connector parts. The interfitting of the bosses 34 and holes 36 and the ribs 38 and slots 40 also enhance the strength of the connector, particularly against shear loads across the plane of the inner surfaces of the connector parts.

The embodiments of the invention described above is intended to be merely exemplary, and those skilled in the art will be able to make numerous variations and modifications of it without departing from the spirit and scope of the invention. All such variations and modifications are intended to be included within the scope of the invention, as defined in the appended claims.

I claim:

1. A net comprising a multiplicity of flexible lines arranged in two groups, each group being composed of a multiplicity of the lines disposed in substantially parallel and spaced-apart relation, and the lines of one group crossing the lines of the other group at a multiplicity of spaced-apart line intersections to define meshes, and a connector at each line intersection securing the lines against relative displacement, each connector having two parts, one such part being disposed generally on each side of a plane defined by the lines, the connector parts having grooves that match and define holes in the connector that receive and capture segments of the lines adjacent the line intersection and having recesses at the line intersection that match and define an enlarged cavity that receives and captures segments of the crossing lines located substantially at the intersection, and the connector parts further having matching and mating surfaces adjacent the grooves and cavities in engagement and adhered to each other to join the connector parts and render the connector essentially unitary.

2. A net according to claim 1 wherein the two parts of each connector have companion bosses and boss-receiving recesses facilitating registration of the two parts and enhancing the strength of the connector.

3. A net according to claim 1 wherein the lines are of fibrous, stranded construction and the grooves and recesses in each connector part have projections that protrude into the fibers and strands of the lines.

4. A net according to claim 3 wherein the projections are generally conical pins.

5. A net according to claim 1 wherein the connector parts are formed of a thermoplastic polymeric material and are adhered to each other at the mating surfaces by a fusion weldment of the materials of the two parts.

6. A net according to claim 5 wherein the fusion weldments are the result of exposure of the parts to energy generated by relative vibrations of the parts at an ultrasonic frequency and wherein the mating surfaces of the connector parts have projections promoting a concentration of energy absorption and a consequent enhancement of the fusion weldments at said projections.

7. A net according to claim 6 wherein the grooves and recesses of the connector parts have projections that engage the lines and are fused by concentrations of energy absorption.

8. A net according to claim 7 wherein the lines are of thermoplastic material and are superficially fusion-bonded to the connector parts.

9. A net according to claim 1 wherein the parts of all connectors are identical.

10. A net according to claim 9 wherein each connector has four quadrants which are dimensionally and geometrically identical.

1. A net comprising a multiplicity of flexible lines, each of which is of stranded multi-element construction and is formed from a thermoplastic polymeric material, the lines being arranged in two groups, each group being composed of a multiplicity of the lines disposed substantially in equally spaced and parallel relation, and the lines of one group crossing the lines of the other group at a multiplicity of spaced-apart line intersections, and a connector at each line intersection securing the lines against relative displacement, each connector being formed of a thermoplastic polymeric material and having two parts, one such part being disposed on each side of a plane defined by the lines, the connector parts having mutually perpendicular grooves that match and define holes in the connector that receive and capture segments of the lines adjacent the line intersection and having recesses at the line intersection that match and define an enlarged cavity that receives and captures segments of the crossing lines at the intersection, each connector part being generally square in plan and the grooves extending generally diagonally across the parts, the portions of the parts between the grooves constituting stiffening webs and defining surfaces that match, are in engagement with each other and are adhered to each other by fusion weldments resulting from exposure of the parts to energy generated by relative vibration of the parts at an ultrasonic frequency to join the connector parts and render the connector essentially unitary.

12. A net according to claim 11 wherein the grooves and recess of each connector part have projections that protrude into the strands of the lines.

13. A net according to claim 12 wherein the projections are generally conical pins having sharp points facilitating protrusion into the lines.

14. A net according to claim 11 wherein the mating surfaces of the connector parts have projections promoting concentration of energy absorption and a consequent enhancement of the fusion bond between the parts.

References Cited

UNITED STATES PATENTS 3,501,366   3/1970   Bramley et al. _____ 161—57

WILLIAM A. POWELL, Primary Examiner

J. J. BELL, Assistant Examiner

U.S. Cl. X.R.

24—201; 156—73, 92; 161—57, 140, 157

PO-1050
(5/69)

UNITED STATES PATENT OFFICE
CERTIFICATE OF CORRECTION

Patent No. 3,733,243            Dated May 15, 1973

Inventor(s) J. H. Crawford

It is certified that error appears in the above-identified patent and that said Letters Patent are hereby corrected as shown below:

Column 3, between lines 13 and 14, insert the following: "from breaking apart or the lines from breaking out of the holes laterally. The surfaces of the connectors may be". Column 6, line 13, change "1" to --11--.

Signed and sealed this 27th day of November 1973.

(SEAL)
Attest:

EDWARD M. FLETCHER, JR.
Attesting Officer

RENE D. TEGTMEYER
Acting Commissioner of Patents